(12) United States Patent
Tsuchiya

(10) Patent No.: US 10,356,321 B2
(45) Date of Patent: Jul. 16, 2019

(54) IMAGING APPARATUS WITH FOCUS ADJUSTMENT CONTROL AND EXPOSURE ADJUSTMENT CONTROL

(71) Applicant: OLYMPUS CORPORATION, Hachioji-shi, Tokyo (JP)

(72) Inventor: Hitoshi Tsuchiya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 61 days.

(21) Appl. No.: 15/385,232

(22) Filed: Dec. 20, 2016

(65) Prior Publication Data

US 2017/0187960 A1    Jun. 29, 2017

(30) Foreign Application Priority Data

Dec. 25, 2015  (JP) ................................. 2015-254323

(51) Int. Cl.
   *H04N 5/228*  (2006.01)
   *H04N 5/232*  (2006.01)
   *H04N 5/235*  (2006.01)

(52) U.S. Cl.
   CPC ....... *H04N 5/23258* (2013.01); *H04N 5/2352* (2013.01); *H04N 5/2353* (2013.01); *H04N 5/23212* (2013.01); *H04N 5/23267* (2013.01); *H04N 5/23287* (2013.01)

(58) Field of Classification Search
   None
   See application file for complete search history.

(56) References Cited

U.S. PATENT DOCUMENTS

| 7,868,912 | B2 * | 1/2011  | Venetianer ........ G06F 17/30799 |
|           |      |         |                          348/143 |
| 9,055,224 | B2 * | 6/2015  | Wakamatsu ......... G02B 27/646 |
| 9,363,437 | B2   | 6/2016  | Motoki |
| 9,525,822 | B2   | 12/2016 | Tsuchiya |

(Continued)

FOREIGN PATENT DOCUMENTS

| CN | 104380709 A | 2/2015 |
| CN | 105122131 A | 12/2015 |
| JP | 2014-126860 A | 7/2014 |

OTHER PUBLICATIONS

Office Action issued in corresponding Chinese Patent Application No. 201611159981.X dated May 7, 2019, consisting of 19 pp. (English Translation Provided).

*Primary Examiner* — Gary C Vieaux
(74) *Attorney, Agent, or Firm* — Volpe and Koenig, P.C.

(57) ABSTRACT

An imaging apparatus includes: an optical system that includes a focus lens and an aperture; an image sensor that converts a subject image formed by the optical system into an electric signal; a reading control circuit that reads the electric signal converted by the image sensor; a shaking detection sensor that detects movement applied to the imaging apparatus, the shaking detection sensor including an angular velocity sensor and an acceleration sensor; a camera-work detection unit that detects camerawork in the imaging apparatus according to a detection result of the shaking detection sensor; and a shooting control unit that controls the focus lens and the aperture in the optical system, and the shooting control unit switches focus adjustment control and/or exposure adjustment control when the camera work is detected by the camera-work detection unit.

8 Claims, 16 Drawing Sheets

(56) References Cited

U.S. PATENT DOCUMENTS

| | | | | |
|---|---|---|---|---|
| 2013/0093905 A1* | 4/2013 | Saitsu | ................ | H04N 5/23258 |
| | | | | 348/208.4 |
| 2014/0186017 A1* | 7/2014 | Shibata | .............. | H04N 5/23248 |
| | | | | 396/55 |
| 2015/0156417 A1* | 6/2015 | Kawai | ................ | H04N 5/23258 |
| | | | | 348/208.1 |
| 2015/0350524 A1* | 12/2015 | Kinoshita | .......... | H04N 5/23219 |
| | | | | 348/345 |
| 2015/0373414 A1* | 12/2015 | Kinoshita | .......... | H04N 5/23216 |
| | | | | 386/282 |

* cited by examiner

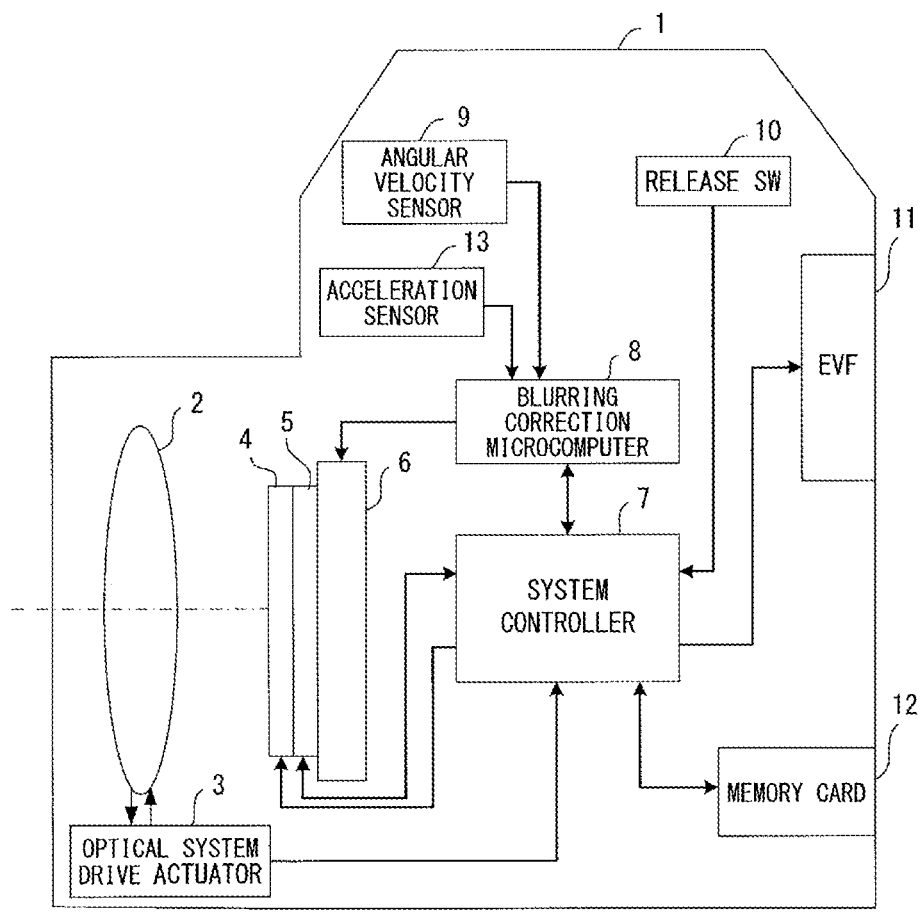
F I G. 14

IMAGING APPARATUS WITH FOCUS ADJUSTMENT CONTROL AND EXPOSURE ADJUSTMENT CONTROL

CROSS-REFERENCE TO RELATED APPLICATIONS

This application is based upon and claims the benefit of priority of the prior Japanese Patent Application No. 2015-254323, filed on Dec. 25, 2015, the entire contents of which are incorporated herein by reference.

FIELD

The present invention relates to an imaging apparatus, in particular, an imaging apparatus that has a function of detecting movement applied to the imaging apparatus.

BACKGROUND

In recent years, imaging apparatuses equipped with an image stabilization function have become common, and their performance has been improved. Therefore, photographers have become able to perform hand-held shooting without being careful of, in particular, camera shake, even for a scene where a subject is dark.

Accordingly, apparatuses are available that cope with severe blurring with a large amplitude, such as with walking, that cannot be corrected conventionally.

As an example, an imaging apparatus described in Patent Document 1 (Japanese Laid-Open patent Publication No. 2014-126860) includes: an imaging optical system that includes a correction optical system, a variable magnification lens, and a focus lens; an imaging unit that captures a subject image; a focal length detection unit that detects a focal length; a subject distance detection unit that detects a subject distance; a walking shooting determination unit that determines whether a user is walking on the basis of a shake amount; a sensitivity generation unit that generates the sensitivity of the correction optical system on the basis of a determination result of the walking shooting determination unit, the focal length, and the subject distance; a correction amount calculation unit that calculates a correction amount of the correction optical system on the basis of the shake amount and the sensitivity; and a control unit that drives the correction optical system according to the correction amount. The sensitivity generation unit generates the sensitivity by limiting the subject distance, the focal length, or a range of the sensitivity when it is determined that a user of the imaging apparatus is walking. This allows image blurring to be stably corrected even in shooting while walking.

SUMMARY

According to an aspect of the present invention, an imaging apparatus is provided that includes: an optical system that includes a focus lens and an aperture; an image sensor that converts a subject image formed by the optical system into an electric signal; a reading control circuit that reads the electric signal converted by the image sensor; a shaking detection sensor that detects movement applied to the imaging apparatus, the shaking detection sensor including an angular velocity sensor and an acceleration sensor; a camera-work detection unit that detects camerawork in the imaging apparatus according to a detection result of the shaking detection sensor; and a shooting control unit that controls the focus lens and the aperture in the optical system, wherein the shooting control unit switches focus adjustment control and/or exposure adjustment control when the camera work is detected by the camera-work detection unit.

According to another aspect of the present invention, an imaging apparatus is provided that includes: an optical system that forms a subject image; an image sensor that converts the subject image formed by the optical system into an electric signal; a reading unit that reads the electric signal converted by the image sensor; a shaking detection sensor that detects movement applied to the imaging apparatus; a walking detection unit that detects walking according to a detection result of the shaking detection sensor; a limiter that limits an upper limit and a lower limit of the detection result of the shaking detection sensor; and a blurring correction unit that corrects movement of the subject image formed on an imaging plane of the image sensor in accordance with the detection result of the shaking detection sensor after limiting by the limiter, wherein when the walking is detected by the walking detection unit, limitation performed by the limiter is disabled.

BRIEF DESCRIPTION OF DRAWINGS

FIG. 14 illustrates an exemplary configuration of a camera that is an imaging apparatus according to a second embodiment.

DESCRIPTION OF EMBODIMENTS

Embodiments of the present invention are described below in detail with reference to the drawings.

First Embodiment

Figure 1:
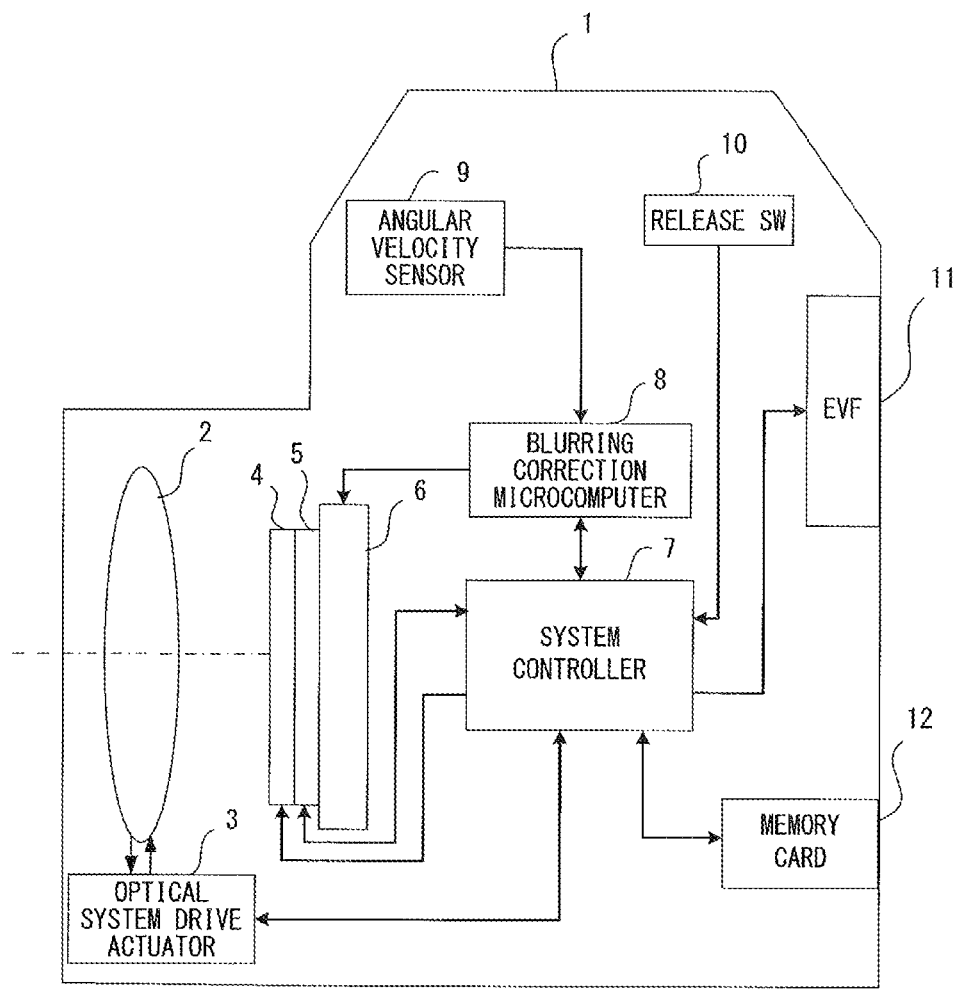
FIG. 1 illustrates an exemplary configuration of a camera that is an imaging apparatus according to a first embodiment.

FIG. 1 illustrates an exemplary configuration of a camera that is an imaging apparatus according to a first embodiment of the present invention.

As described in FIG. 1, a camera 1 according to this embodiment includes an optical system 2, an optical system drive actuator 3, a shutter 4, an image sensor 5, a blurring correction drive actuator 6, a system controller 7, a blurring correction microcomputer 8, an angular velocity sensor 9, a release SW 10, an electric view finder (EVF) 11, and a memory card 12.

The optical system 2 includes a focus lens and an aperture that are not illustrated.

The optical system drive actuator 3 controls a focus lens position (also simply referred to as a focus position) or an aperture position in the optical system 2 under the control of the system controller 7. Consequently, an image of a light flux from a subject can be formed as an in-focus image on an imaging plane of the image sensor 5.

The shutter 4 is arranged on a front surface of the image sensor 5, and the shutter 4 makes the imaging plane of the image sensor 5 enter into an exposure state or a light shielding state by opening or closing a shutter curtain under the control of the system controller 7. Consequently, an exposure time of the image sensor 5 in shooting can be controlled.

The image sensor 5 is an image sensor such as a charge coupled device (CCD) or a complementary metal oxide semiconductor (CMOS), and the image sensor 5 converts a subject image formed on an imaging plane into an electric signal. The converted electric signal is read as a video signal by the system controller 7.

The blurring correction drive actuator 6 moves the image sensor 5 on a plane orthogonal to an optical axis of the optical system 2 under the control of the blurring correction microcomputer 8. As an example, the blurring correction drive actuator 6 moves the image sensor 5 in a direction in which an image movement amount (an image blurring amount in image blurring) that has been generated on the imaging plane of the image sensor 5 is cancelled under the control of the blurring correction microcomputer 8 such that the image sensor 5 can maintain a stable image-formation state and can obtain video data (image data) without blurring.

The system controller 7 controls the entire operation of the camera 1. As an example, the system controller 7 controls an operation performed by the image sensor 5, such as setting of sensitivity (ISO speed) at the time of exposing the image sensor 5 or specification of a video reading cycle. As another example, the system controller 7 performs control to convert a video signal read from the image sensor 5 into a format for displaying the video signal on the EVF 11 and to display the video signal as a live-view video, or performs control to convert the video signal into image data in a recording format and to record the image data in the memory card 12. As another example, the system controller 7 performs control to convert image data read from the memory card 12 into a format for displaying the image data on the EVF 11 and to display the image data. As another example, the system controller 7 reports, to the blurring correction microcomputer 8, focal length information of the optical system 2 that has been obtained from the optical system drive actuator 3, or the like, as a parameter for blurring correction. As another example, the system controller 7 performs control to adjust exposure and a focus, as described later with reference to FIG. 7 or the like. As another example, the system controller 7 detects a user's operation such as the operation of the release SW 10, or performs control to open or close the shutter 4.

The blurring correction microcomputer 8 controls the blurring correction drive actuator 6 so as to move the image sensor 5 in a direction in which image movement (image blurring) generated on the imaging plane of the image sensor 5 is cancelled in accordance with an output of the angular velocity sensor 9 (an angular velocity output due to a rotational motion applied to the camera 1) and the focal length information reported from the system controller 7 under the control of the system controller 7. The detailed configuration of the blurring correction microcomputer 8 will be described later with reference to FIG. 2.

The angular velocity sensor 9 is a sensor that detects movement applied to the camera 1 (a rotational motion). In this embodiment, it is assumed that the angular velocity sensor 9 is a sensor that detects movements (rotational motions) in a Yaw direction and a Pitch direction that are applied to the camera 1 as angular velocity.

The release SW 10 detects an operation to half depress an SW and an operation to fully depress the SW that are performed by a user, and reports the operations to the system controller 7.

The EVF 11 displays, for example, a video signal read from the image sensor 5 as a live-view video under the control of the system controller 7.

The memory card 12 records, for example, the video signal read from the image sensor 5 as image data.

Figure 2:
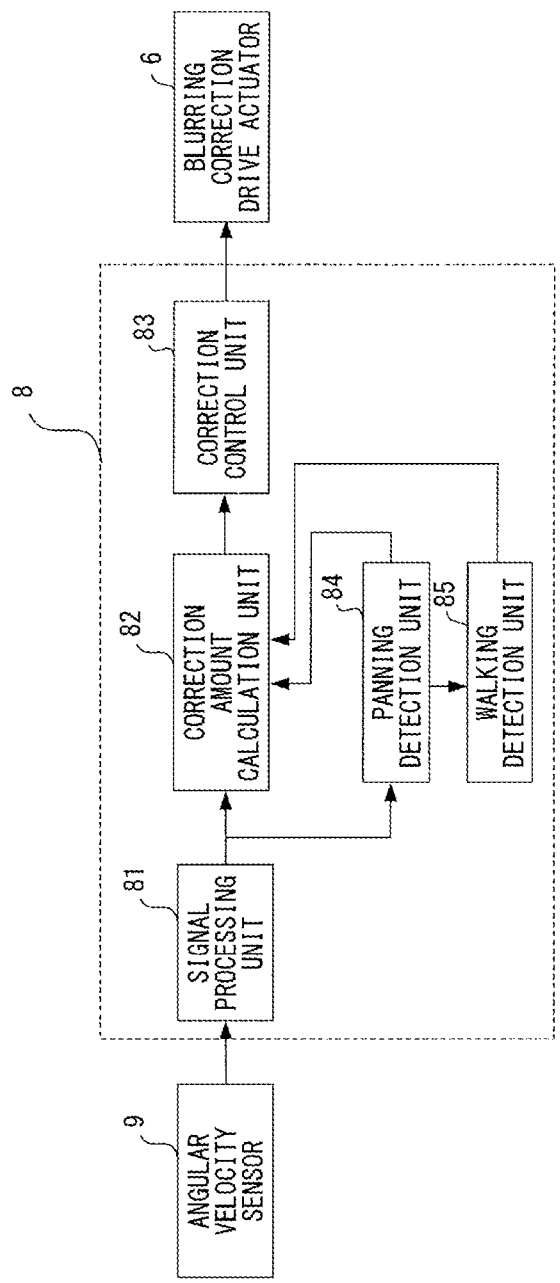
FIG. 2 illustrates an exemplary configuration of a blurring correction microcomputer.

FIG. 2 illustrates an exemplary configuration of the blurring correction microcomputer 8.

As illustrated in FIG. 2, the blurring correction microcomputer 8 includes a signal processing unit 81, a correction amount calculation unit 82, a correction control unit 83, a panning detection unit 84, and a walking detection unit 85.

The signal processing unit 81 converts an angular velocity output that is output as an analog signal from the angular velocity sensor 9 into a digital signal, and performs a process for subtracting a reference value. Consequently, the angular velocity output from the angular velocity sensor 9 is converted into a signed digital signal. The reference value is a value obtained by converting the angular velocity output from the angular velocity sensor 9 into a digital signal when the camera 1 is in a stationary state. Accordingly, as an example, a state in which a value after subtraction of the reference value is 0 indicates that the camera 1 is in a stationary state, and the sign of the value after subtraction of the reference value indicates a rotation direction of the camera 1.

The correction amount calculation unit 82 calculates a correction amount on the basis of angular velocity processed by the signal processing unit 81, a detection result of the panning detection unit 84, a detection result of the walking detection unit 85, and the focal length information reported from the system controller 7. The detailed configuration of the correction amount calculation unit 82 will be described later with reference to FIG. 3.

The correction control unit 83 converts the correction amount calculated by the correction amount calculation unit 82 into a drive signal of the blurring correction drive actuator 6, and outputs the drive signal to the blurring correction drive actuator 6. The blurring correction drive actuator 6 is driven according to the drive signal such that the image sensor 5 moves in a direction in which image movement (image blurring) generated on the imaging plane of the image sensor 5 is canceled.

The panning detection unit 84 detects whether the camera 1 has been panned on the basis of the angular velocity (an angular velocity in the Yaw direction or the Pitch direction) that has been processed by the signal processing unit 81. Panning is an example of camera work, and refers to a user's operation to intentionally shake the camera 1, for example, vertically or horizontally. A method for detecting panning performed by the panning detection unit 84 will be described later with reference to FIG. 4.

The walking detection unit 85 detects whether a user holding the camera 1 is walking on the basis of a detection result of the panning detection unit 84. Walking with holding the camera 1 is an example of camera work. A method for detecting walking performed by the walking detection unit 85 will be described later with reference to FIG. 4 or the like. The detailed configuration of the walking detection unit 85 will be described later with reference to FIG. 5.

Figure 3:
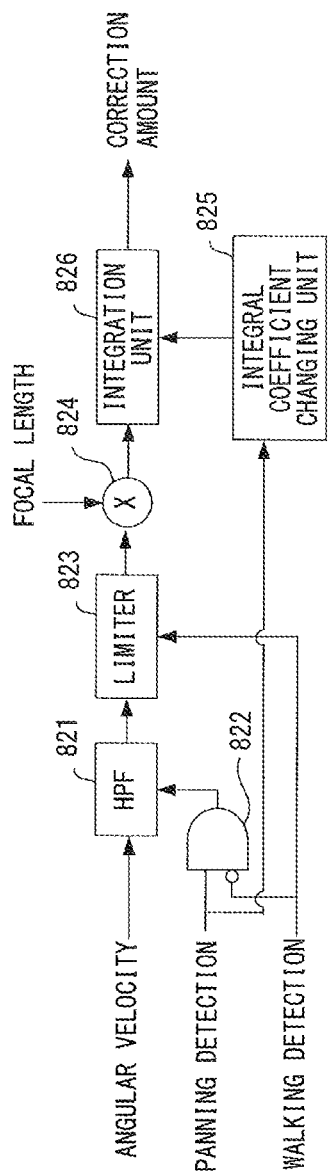
FIG. 3 illustrates an exemplary configuration of a correction amount calculation unit.

FIG. 3 illustrates an exemplary configuration of the correction amount calculation unit 82.

As illustrated in FIG. 3, the correction amount calculation unit 82 includes a high-pass filter (HPF) 821, a condition determination unit 822, a limiter 823, a multiplication unit 824, an integral coefficient changing unit 825, and an integration unit 826.

The HPF 821 removes a low-frequency component (a component that is smaller than or equal to a cutoff frequency) from an input value of angular velocity processed by the signal processing unit 81. The HPF 821 also changes the cutoff frequency to a higher cutoff frequency, only when a determination result of the condition determination unit 822 is a determination result indicating that a condition is satisfied.

The condition determination unit 822 determines whether a condition is satisfied that panning has been detected by the panning detection unit 84 (panning detection) and that walking has not been detected by the walking detection unit 85, and the condition determination unit 822 reports a determination result to the HPF 821. By doing this, as an example, when the condition is satisfied, a cutoff frequency of the HPF 821 is increased, and consequently, a blurring correction effect is reduced.

When an angular velocity that is an output of the HPF 821 exceeds a prescribed threshold, the limiter 823 performs clipping, and limits an upper limit and a lower limit of the angular velocity that is an output of the HPF 821. However, the limiter 823 is disabled only when walking has been detected by the walking detection unit 85, and the limiter 823 does not perform clipping. Namely, when walking has been detected, the output of the HPF 821 is output to a post-stage with no change.

The limiter 823 performs clipping when walking has not been detected by the walking detection unit 85 for the following reason. It is assumed that clipping is not performed when walking has not been detected by the walking detection unit 85. In this case, as an example, when camera work is performed in such a way that a shooting field of view is changed, a correction amount increases, and responsiveness of changing view deteriorates. Accordingly, when walking has not been detected by the walking detection unit 85, clipping is performed such that blurring correction is not performed for an angular velocity that exceeds a prescribed threshold, and this allows responsiveness of blurring correction to camera work to be improved. On the other hand, the reason why clipping is not performed when walking has been detected by the walking detection unit 85 is that a large blurring is generated when walking, and that, when clipping is performed, a blurring correction effect is reduced and the appearance of a shot image is damaged.

The multiplication unit 824 multiplies an angular velocity that is an output of the limiter 823 by the focal length information reported from the system controller 7, and calculates an image movement amount on the imaging plane of the image sensor 5.

The integral coefficient changing unit 825 outputs an integral coefficient (a value that is smaller than 1) to the integration unit 826. When panning is detected by the panning detection unit 84 (panning detection), the integral coefficient changing unit 825 changes the integral coefficient output to the integration unit 826 to a smaller value such that an attenuation rate of an accumulated value obtained by the integration unit 826 increases.

The integration unit 826 accumulates (integrates) multiplication results of the multiplication unit 824, and multiplies an accumulated value by the integral coefficient output from the integral coefficient changing unit 825 so as to calculate a correction amount. As described above, by multiplying an accumulated value by an integral coefficient, an accumulated value is attenuated. In addition, by doing this, the correction amount decreases with time, and the position of the image sensor 5 approaches an initial position, and therefore blurring correction can be continuously performed. When an integral coefficient is changed to a smaller value by the integral coefficient changing unit 825, the attenuation rate of the accumulated value increases, and consequently, the time needed to return the image sensor 5 to an initial position can be reduced.

Figure 4:
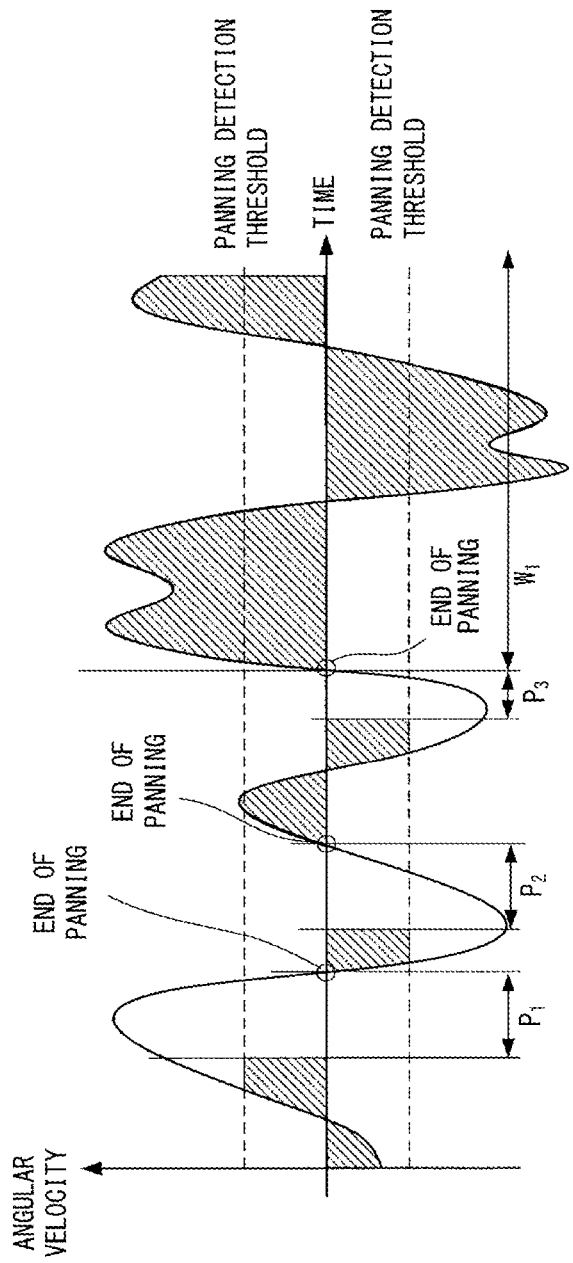
FIG. 4 is a diagram explaining an example of panning detection performed by a panning detection unit and walking detection performed by a walking detection unit.

FIG. 4 is a diagram explaining an example of panning detection performed by the panning detection unit 84 and walking detection performed by the walking detection unit 85.

In FIG. 4, a vertical axis indicates angular velocity (an angular velocity in the Yaw direction or the Pitch direction), and a horizontal axis indicates time. A solid line indicates a change with time in angular velocity. The area of a shaded portion indicates a correction amount of blurring correction. Periods $P_1$, $P_2$, and $P_3$ indicate panning detection periods, and period $W_1$ indicates a walking detection period.

In the example illustrated in FIG. 4, control is performed in such a way that blurring detection stops during panning detection, as indicated by periods $P_1$, $P_2$, and $P_3$. This is because, when a normal blurring correction continues during panning detection, a blurring correction range is immediately used up, blurring correction performance immediately after the end of panning deteriorates, and the appearance of a shot image deteriorates. When blurring correction stops during panning detection, the appearance of a shot image during panning detection may deteriorate. Accordingly, when the appearance during panning detection is desired to be improved, the characteristic of blurring correction may be changed, for example, by the integral coefficient changing unit 825 above changing an integral coefficient such that a blurring correction effect during panning detection is reduced.

As illustrated in the example of FIG. 4, the panning detection unit 84 detects panning (the start of panning) when an input angular velocity continuously exceeds a panning detection threshold during a prescribed period. Blurring correction is performed until the start of panning is detected. However, blurring correction is not performed for an angular velocity that exceeds the panning detection threshold, because the panning detection threshold is a threshold used when the limiter 823 performs clipping in this example. After the panning detection unit 84 detects panning, the panning detection unit 84 detects the end of panning at a zero-crossing timing that is a timing at which angular velocity crosses a reference value.

In the example illustrated in FIG. 4, when a user holding the camera 1 starts walking, blurring (movement or a rotational motion) applied to the camera 1 increases, and the amplitude of angular velocity also increases. In this case, the panning detection unit 84 detects panning, but the panning detection unit 84 immediately detects the end of panning, unlike a normal panning.

In this embodiment, in a case in which the end of panning is frequently detected during each unit time period, the walking detection unit 85 detects walking. In the example illustrated in FIG. 4, period P3 ends, and therefore walking is detected. After walking is detected by the walking detection unit 85, the limiter 823 is disabled, and blurring correction is performed on all of the detected angular velocities.

Figure 5:
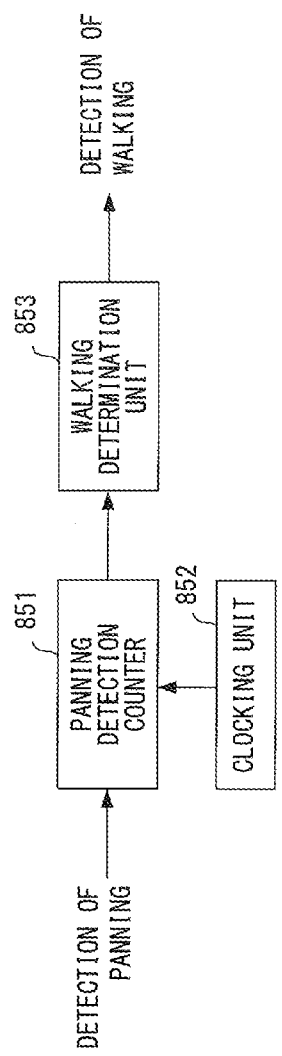
FIG. 5 illustrates an exemplary configuration of a walking detection unit.

FIG. 5 illustrates an exemplary configuration of the walking detection unit 85.

As illustrated in FIG. 5, the walking detection unit 85 includes a panning detection counter 851, a clocking unit 852, and a walking determination unit 853.

The panning detection counter 851 is a counter that counts up when the panning detection counter 851 detects the end of panning on the basis of a detection result of the panning detection unit 84, and that counts down upon receipt of a periodic report from the clocking unit 852.

The clocking unit 852 includes a timer, and issues a periodic report to the panning detection counter 851.

The walking determination unit 853 detects walking when a counter value of the panning detection counter 851 exceeds a prescribed threshold (a walking detection threshold).

In the walking detection unit 85 having the configuration above, when the panning detection counter 851 counts up one or more times in a cycle in which a report is issued from the clocking unit 852 to the panning detection counter 851, the counter value of the panning detection counter 851 increases. When the panning detection counter 851 does not count up in the cycle in which a report is issued from the clocking unit 852 to the panning detection counter 851, the counter value of the panning detection counter 851 decreases. When the counter value of the panning detection counter 851 exceeds a walking detection threshold, the walking determination unit 853 detects walking. When the counter value of the panning detection counter 851 is smaller than or equal to the walking detection threshold, a state in which the walking determination unit 853 detects walking is released.

Figure 6:
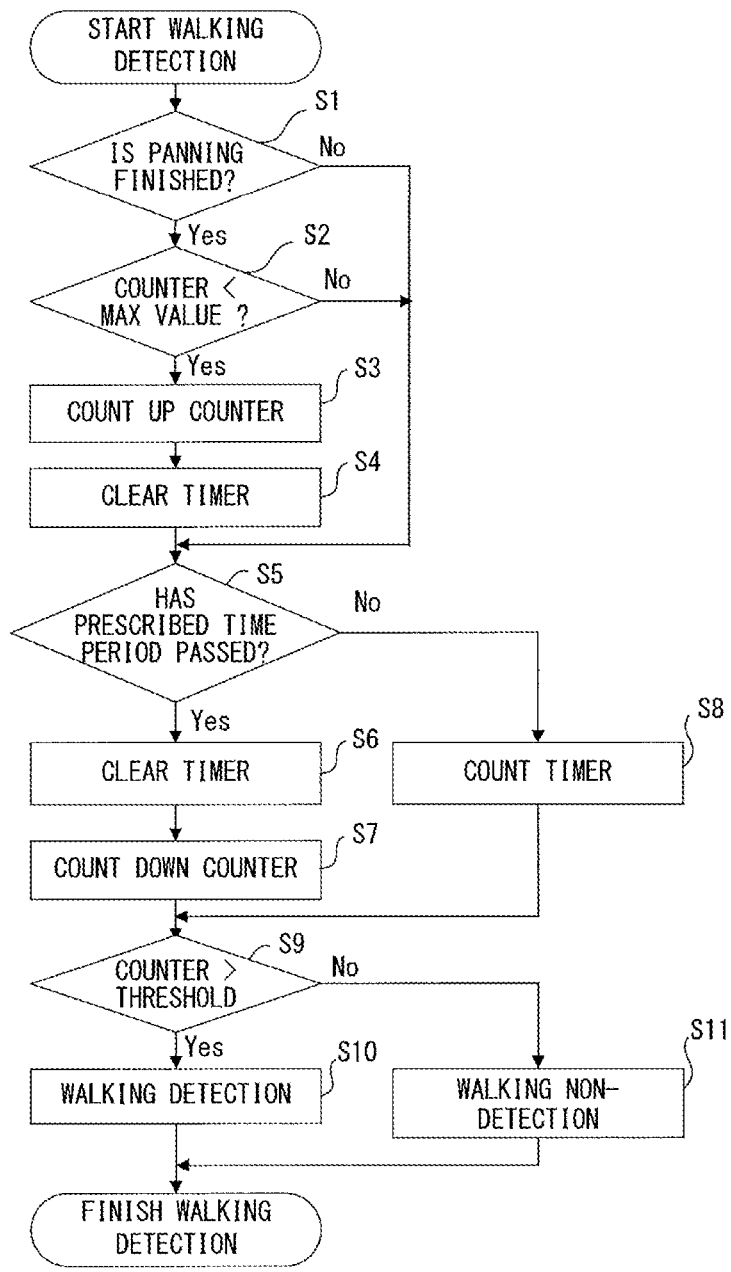
FIG. 6 is a flowchart illustrating an example of walking detection processing performed by a walking detection unit.

FIG. 6 is a flowchart illustrating an example of walking detection processing performed by the walking detection unit 85.

This processing is periodically performed during a blurring correction operation of the camera 1.

As illustrated in FIG. 6, when this processing is started, the panning detection counter 851 first determines whether the end of panning has been detected on the basis of a detection result of the panning detection unit 84 (S1).

When the determination result in S1 is Yes, the panning detection counter 851 determines whether the counter value of the local counter is smaller than a MAX value (S2).

When the determination result in S2 is Yes, the panning detection counter 851 counts up (S3), and the clocking unit 852 clears the timer (S4).

When the determination result in S1 is NO, when the determination result in S2 is No, or after the process of S4 is performed, the processing moves on to S5. When the determination result in S2 is No (when the counter value is a Max value), counting up is no longer performed, and the processes of S3 and S4 are skipped.

In S5, the clocking unit 852 determines according to a counter value of the timer whether a prescribed time period has passed (whether a prescribed time period has passed after the timer was cleared).

When the determination result in S5 is Yes, the clocking unit 852 clears the timer (S6), and the panning detection counter 851 counts down (S7).

When the determination result in S5 is No, the timer of the clocking unit 852 performs counting (S8).

After the process of S7 or S8, the walking determination unit 853 determines whether the counter value of the panning detection counter 851 exceeds a walking detection threshold (S9).

When the determination result in S9 is Yes, the walking determination unit 853 detects walking (S10). Consequently, the determination result of the walking determination unit 853 becomes a walking detection result.

When the determination result in S9 is No, the walking determination unit 853 does not detect walking (S11). Consequently, the determination result of the walking determination unit 853 becomes a walking non-detection state.

When the process of S10 or S11 is finished, one sequence (one cycle) of walking detection processing is finished, and processing returns to S1.

By periodically repeating the processing illustrated in FIG. 6, a walking state is detected when a user holding the camera 1 starts walking, and the walking state is released when the user stops walking.

Figure 7:
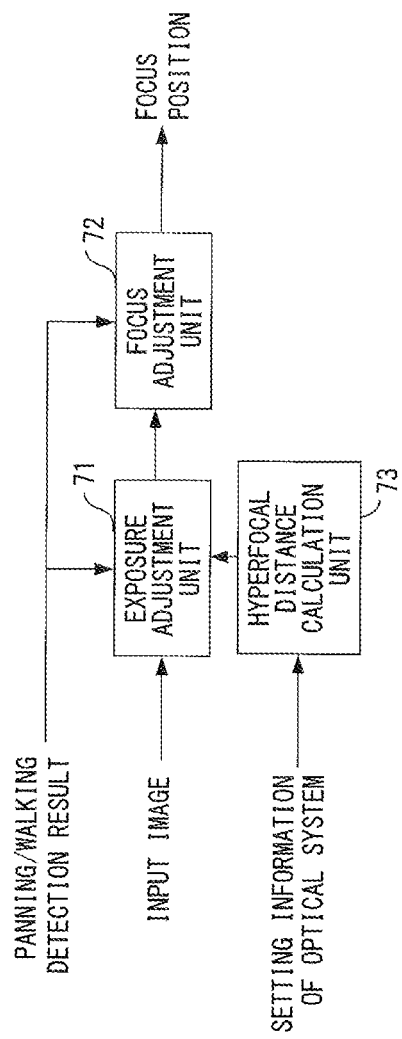
FIG. 7 illustrates an example of a configuration in which control is performed to adjust exposure and to adjust a focus in a system controller.

FIG. 7 illustrates an example of a configuration in which control is performed to adjust exposure and to adjust a focus in the system controller 7. In addition, FIG. 7 is a block diagram illustrating a relationship between exposure adjustment control and focus adjustment control, and panning detection and walking detection.

In FIG. 7, an exposure adjustment unit 71 calculates Ev (an exposure value) on the basis of an input image (image data that has been read from the image sensor 5 and on which conversion has been performed), and the exposure adjustment unit 71 determines Tv (a time value: shutter speed), Av (an aperture value) and Sv (a (film) sensitivity value: an image sensor sensitivity) ISO speed. The exposure adjustment unit 71 sets the optical system 2 to have an aperture value that corresponds to the Av, sets the image sensor 5 to have a sensitivity that corresponds to the Sv, and performs shooting control according to the Tv. In this embodiment, the Tv, the Av, and the Sv are expressed as APEX values.

A focus adjustment unit 72 controls the focus position of the optical system 2 in such a way that the in-focus image of a target subject is formed on an imaging plane of the image sensor 5.

Whether a subject is focused is determined in various ways. It is assumed, as an example, that contrast is detected in an arbitrary portion (for example, a focus area portion) of image data that has been read from the image sensor 5 and on which conversion has been performed, and that the focus position of the optical system 2 is adjusted in such a way that an evaluation value (a contrast evaluation value) becomes maximum.

At this time, an operation referred to as wobbling is performed in order to detect a peak of the evaluation value.

Wobbling is an operation to move a focus lens of the optical system 2 to positions before and after the peak of the evaluation value and to determine an accurate position in which the evaluation value becomes peak.

The focus adjustment unit 72 performs control to periodically determine the evaluation value, to determine that a subject is not focused when the evaluation value greatly decreases, to scan a focus position so as to detect a position near the peak of the evaluation value, to perform wobbling again so as to detect the peak of the evaluation value, and to move the focus lens of the optical system 2 to a position of the peak.

A hyperfocal distance calculation unit 73 determines an Av in such away that a current position of a subject is a hyperfocal distance, in accordance with setting information of the optical system 2 that has been obtained from the optical system drive actuator 3, and the hyperfocal distance calculation unit 73 reports the Av to the exposure adjustment unit 71. The exposure adjustment unit 71 that has received a report relating to the Av performs control to adjust exposure by using the Av as a reference.

The hyperfocal distance is described here.

The hyperfocal distance is a focal length at which all of the subjects located at distances from half of the hyperfocal distance to infinity are focused when a certain aperture value is used, and the hyperfocal distance can be obtained according to the following expression (1).

$$\text{Hyperforcal distance} = \text{focal length} \times \text{focal length} / \text{aperture value} / \text{acceptable circle of confusion expression} \quad (1)$$

As an example, it is assumed that an acceptable circle of confusion is 35 μm in 35 mm terms. A hyperfocal distance of 50 mmF8 is 8928.571 mm, and a range in which a subject is focused is from about 4.5 m to infinity.

The operations of respective units when panning or walking is detected are described next.

When panning or walking is detected, the exposure adjustment unit 71 determines an Sv and a Tv according to an Av reported from the hyperfocal distance calculation unit 73. After the exposure adjustment unit 71 has determined the Av, the exposure adjustment unit 71 does not calculate an evaluation value until panning or walking is not detected. The focus adjustment unit 72 fixes a focal position in such a way that the position of a subject that is focused immediately before the detection of panning or walking is a hyperfocal distance, and performs control to suppress wobbling until panning or walking is not detected.

Consequently, blurring due to focus readjustment or a flicker due to a change in brightness that is caused by a great change in the position of a subject during panning or walking can be suppressed, and the appearance of a video can be prevented from deteriorating.

Figure 8:
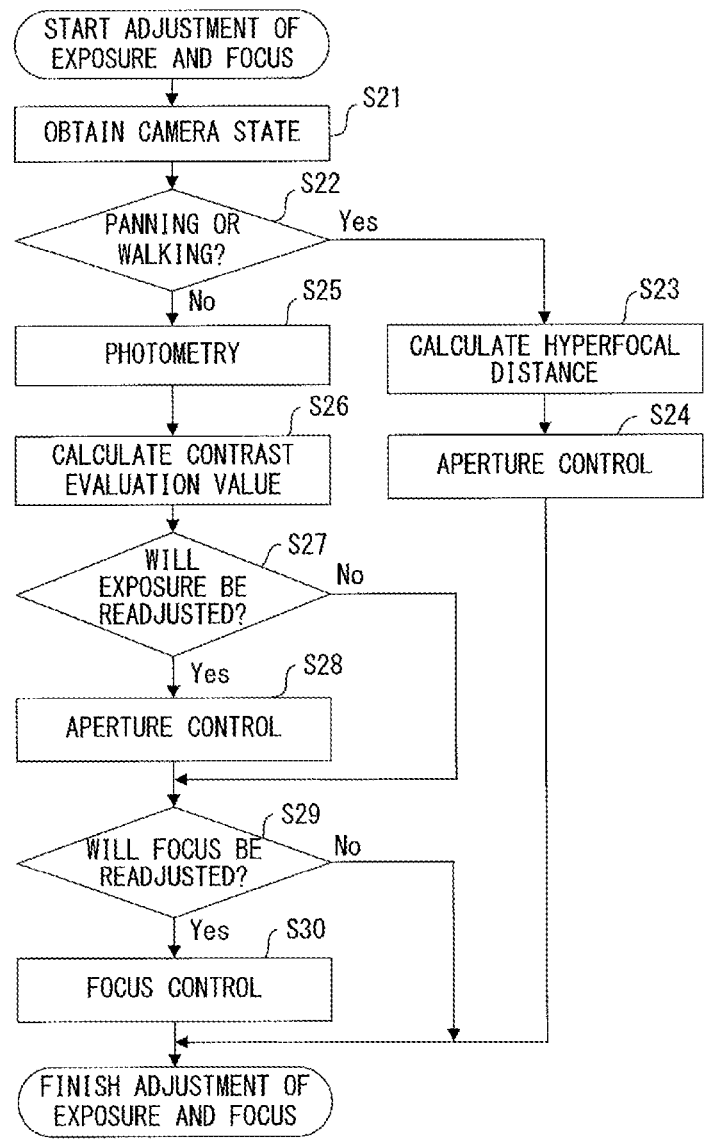
FIG. 8 is a flowchart illustrating an example of control processing relating to the adjustment of exposure and a focus performed by a system controller.

FIG. 8 is a flowchart illustrating an example of control processing relating to the adjustment of exposure and a focus performed by the system controller 7.

This processing is performed in every cycle of the adjustment of exposure and a focus.

As illustrated in FIG. 8, when this processing is started, the system controller 7 first obtains a camera state (S21). The camera state includes information that indicates a panning detection state (or a panning non-detection state) and a walking detection state (or a walking non-detection state) that are obtained from the blurring correction microcomputer 8, setting information of the optical system 2 that is obtained from the optical system drive actuator 3, and the like.

Then, the system controller 7 determines whether panning or walking has been detected on the basis of the camera state obtained in S21 (S22).

When the determination result in S22 is Yes, the system controller 7 calculates a hyperfocal distance (S23). More specifically, the hyperfocal distance calculation unit 73 determines an Av at which a current focus position is a hyperfocal distance, on the basis of focus position information included in the setting information of the optical system 2, and the hyperfocal distance calculation unit 73 reports the Av to the exposure adjustment unit 71.

After S23, the system controller 7 performs aperture control (S24). More specifically, the exposure adjustment unit 71 that has received a report relating to the Av in S23 changes an aperture value that has been set for the optical system 2 to an aperture value that corresponds to the reported Av.

When the determination result in S22 is Yes, a current focus position of the optical system 2 is maintained. Namely, the focus position of the optical system 2 is fixed to a focus position immediately before the detection of panning or walking.

In a case in which the determination result in S22 is continuously Yes, only when the determination result in S22 first becomes Yes (namely, only when the start of panning or walking is detected) are the processes of S23 and S24 performed.

When the determination result in S22 is No, the system controller 7 performs a photometry process so as to calculate luminance of a subject (S25), and calculates a contrast evaluation value in a focus area (S26).

After S26, the system controller 7 determines whether exposure will need to be readjusted (S27). Whether exposure will need to be readjusted is determined according to whether a subject luminance has changed or whether the end of panning or walking has been detected. Stated another way, when a subject luminance has changed, or when the end of panning or walking has been detected, it is determined that exposure will need to be readjusted. When a subject luminance has not changed and when the end of panning or walking has not been detected, it is determined that exposure will not need to be readjusted. Whether the subject luminance has changed is also, for example, whether a difference exists between a subject luminance calculated in S25 and a subject luminance that has previously been calculated in S25. In addition, whether the end of panning or walking has been detected is also whether the determination in S27 is performed for the first time since the determination result in S22 became Yes.

When the determination result in S27 is Yes, the system controller 7 performs aperture control (S28). More specifically, the exposure adjustment unit 71 determines an Av as a result of the photometry process of S25, and changes an aperture value that has been set for the optical system 2 to an aperture value that corresponds to the Av.

When the determination result in S27 is No, or after the process of S28 is performed, the system controller 7 determines whether a focus will need to be re-adjusted (S29).

Whether a focus will need to be readjusted is determined according to whether a contrast evaluation value in a focus area has changed or whether the end of panning or walking has been detected. Stated another way, when the contrast evaluation value in the focus area has changed, or when the end of panning or walking has been detected, it is determined that a focus will need to be re-adjusted. When the contrast evaluation value in the focus area has not changed and when the end of panning or walking has not been detected, it is determined that a focus will not need to be readjusted. Here, whether the contrast evaluation value in the focus area has changed is also, for example, whether a difference exists between a contrast evaluation value calculated in S26 and a contrast evaluation value that has previously been calculated in S26. In addition, whether the end of panning or walking has been detected is also whether the determination in S29 is performed for the first time since the determination result in S22 became Yes.

When the determination result in S29 is Yes, the system controller 7 performs focus control (S30). Namely, the focus adjustment unit 72 controls the focus position of the optical system 2 in such a way that the in-focus image of a target subject is formed on an imaging plane of the image sensor 5. Consequently, the focus position of the optical system 2 is changed.

When the process of S24 or S30 is finished, or when the determination result in S29 is No, one cycle of processing for adjusting exposure and a focus is finished, and the processing returns to S21.

Figure 9:
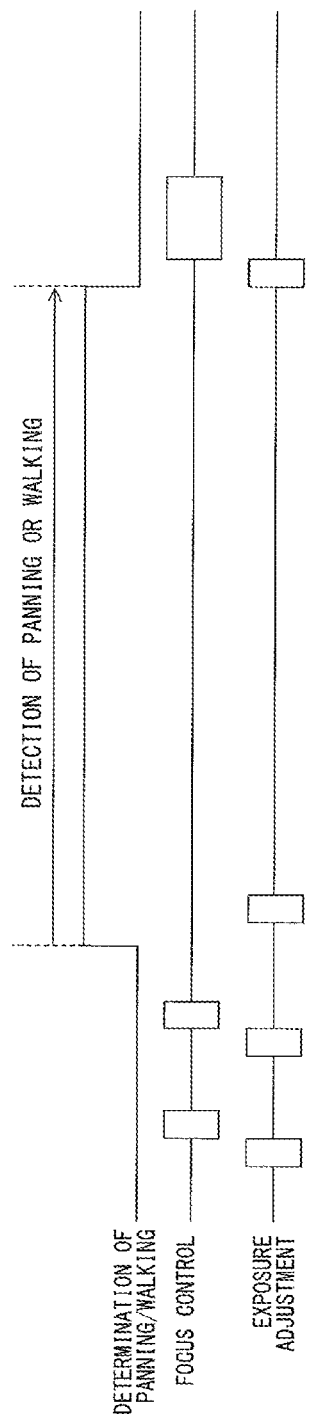
FIG. 9 is an example of a timing chart illustrating a relationship among panning detection or walking detection, an operation performed by a focus adjustment unit, and an operation performed by an exposure adjustment unit.

FIG. 9 is an example of a timing chart illustrating a relationship among panning detection or walking detection (panning determination or walking determination), an operation performed by the focus adjustment unit 72, and an operation performed by the exposure adjustment unit 71.

As illustrated in FIG. 9, as an example, when the camera 1 is in a stationary state (when panning or walking has not been detected), the operation of the exposure adjustment unit 71 and the operation of the focus adjustment unit 72 are performed in a fixed cycle.

When panning or walking is detected, the operation of the exposure adjustment unit 71 is performed once, and the operation of the exposure adjustment unit 71 and the operation of the focus adjustment unit 72 stop. When the end of panning or walking is detected, the operation of the exposure adjustment unit 71 and the operation of the focus adjustment unit 72 are restarted. It may take a longer time than usual to perform the restarting operation of the focus adjustment unit 72, depending on a main subject distance and the focus position of the optical system 2 at a current point in time, as illustrated in FIG. 9, for example.

By performing the operations above, a focus position and an exposure condition are not changed during panning or walking (except the first operation of the exposure adjustment unit 71), and therefore a stable image can be obtained. In addition, after panning or walking is finished, shooting setting can be quickly changed according to a new subject.

Figure 10:
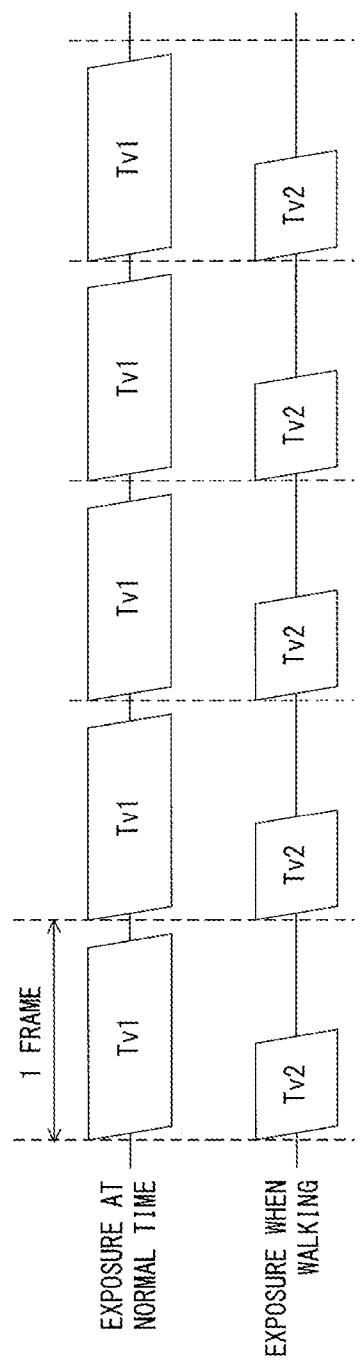
FIG. 10 illustrates examples of timings at which a system controller reads a video signal from an image sensor at a normal time and when walking.

FIG. 10 illustrates examples of timings at which the system controller 7 reads a video signal from the image sensor 5 at a normal time and when walking.

As illustrated in FIG. 10, at a normal time (for example, at a stationary time), a video is shot at exposure time Tv1 that approximately matches a time interval for one frame, and when walking, a video is shot at exposure time Tv2 that is shorter than the time interval for one frame.

By doing this, even when blurring is generated greatly during walking, blurring during exposure can be suppressed, and therefore bleeding in an image for each frame can be reduced, and image quality can be prevented from deteriorating.

Figure 11:
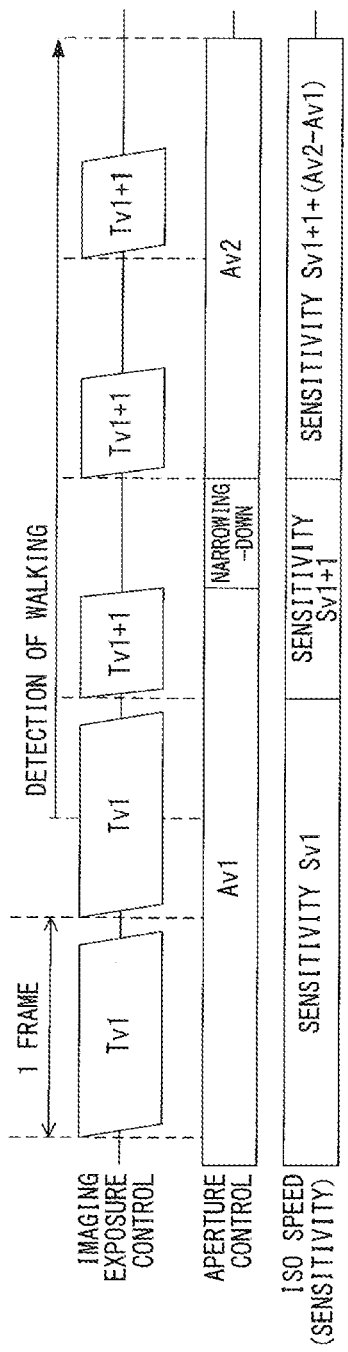
FIG. 11 is an example of a timing chart illustrating a control switching relationship among imaging exposure control, aperture control, and ISO speed in a case in which a state is transitioned from a normal state to a walking detection state.

FIG. 11 is an example of a timing chart illustrating a control switching relationship among imaging exposure control, aperture control, and ISO speed in a case in which a state is transitioned from a normal state to a walking detection state.

As illustrated in FIG. 11, it is assumed that, in a normal state (a walking non-detection state), shooting is performed by using an appropriate exposure when an exposure time is Tv1, an aperture value is Av1, and an ISO speed that is the imaging sensitivity of an image sensor is Sv1.

In this case, when walking is detected, an exposure time is first made to be one half by adding 1 to a Tv (an exposure time indicated by an APEX value) (Tv1+1) such that exposure blurring is reduced. In addition, ISO speed is doubled by adding 1 to an Sv (an ISO speed indicated by an APEX value) (Sv1+1) such that a brightness of an image is prevented from changing due to a change in the Tv (the exposure time).

An aperture of the optical system 2 is narrowed down in such a way that a main subject distance is a hyperfocal distance. It is assumed here that an aperture value indicated by an APEX value before narrowing-down is Av1, and that an aperture value indicated by an APEX value after narrowing-down is Av2. ISO speed is changed according to a difference from the aperture value before narrowing-down (Av2−Av1) in a frame next to a frame in which narrowing-down has been performed. Specifically, the changed ISO speed is a value (Sv1+1+(Av2−Av1)) that is obtained by adding a difference in an aperture value to an Sv that is an ISO speed before narrowing-down. By doing this, brightness in an image is prevented from changing due to narrowing-down, when walking is detected.

Consequently, as an example, even when walking is started while shooting a video, exposure blurring can be suppressed by changing an exposure condition without incongruity.

In this example, 1 is added to a Tv. However, a value added to a Tv is not limited to 1, and as an example, when a subject is bright, a value that makes an exposure time shorter may be added.

In this example, a Tv may be added according to whether optical blurring correction has been performed, and in particular, in a case in which an image stabilization function is not included, it is preferable that control be performed to reduce an exposure time.

In this example, when walking is detected, an exposure time is changed to an exposure time for walking in the next frame. However, the exposure time may be gradually changed in a plurality of frames. In this case, exposure setting is suppressed from suddenly changing between frames, and therefore a feeling of incongruity is reduced, and this is effective when images are continuously recorded like a video.

As described above, according to this embodiment, even when panning or walking is performed while shooting a video, the generation of blurring due to the malfunction of focus control, a flicker due to a great change in brightness, or the deterioration of image quality due to exposure blurring can be suppressed, and a video having a satisfactory appearance can be shot.

The following variation can be made to this embodiment.

In this embodiment, a hyperfocal distance is used for a focus position and an aperture when panning or walking is detected, but the hyperfocal distance is not always used. As an example, setting immediately before the detection of panning or walking may be fixed, as described later with reference to FIG. 12, or when a user is walking toward a subject, setting may be changed in a direction to reduce a subject distance according to a walking cycle, as described in detail in a second embodiment. Stated another way, when panning or walking is detected, any setting may be employed that suppresses at least a focus adjustment operation (an operation to detect a focus position) and/or an exposure adjustment operation.

In this embodiment, a blurring correction mechanism is included; however, the blurring correction mechanism may be omitted, if means for detecting panning or walking is included.

Figure 12:
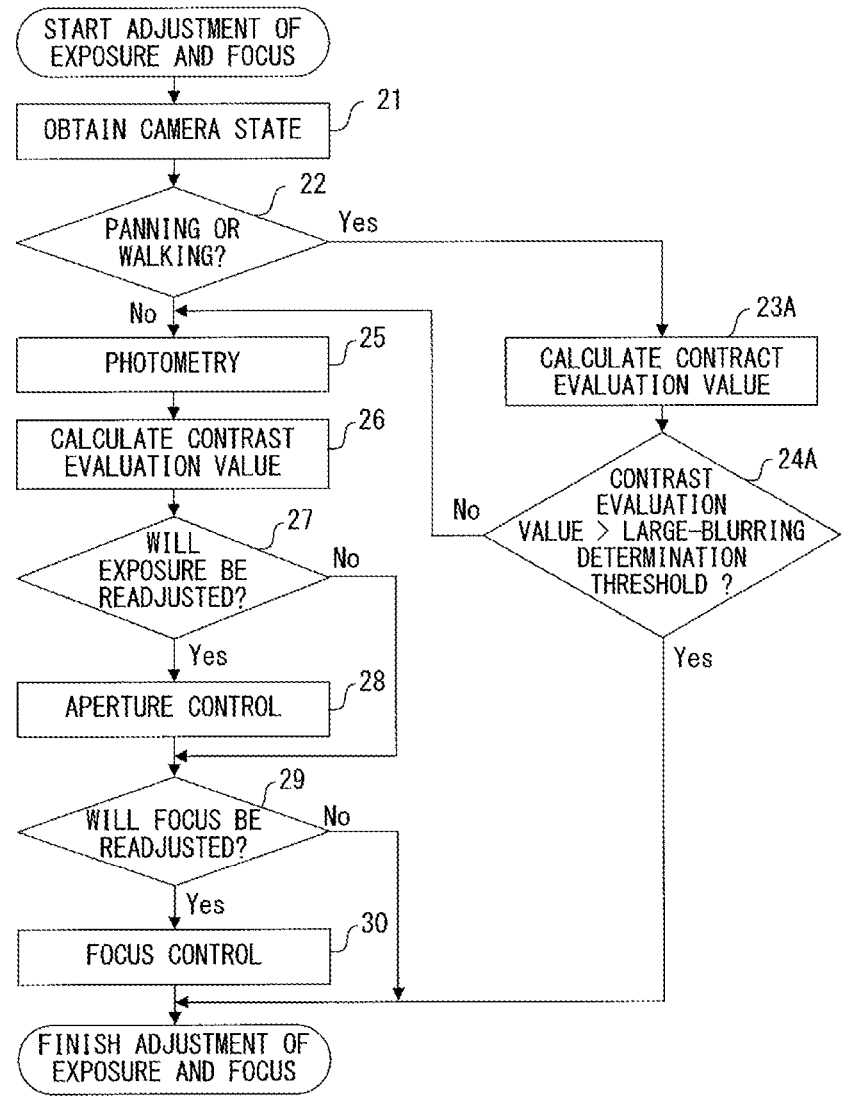
FIG. 12 is a flowchart illustrating an example of control processing relating to the adjustment of exposure and a focus according to a variation.

FIG. 12 is a flowchart illustrating an example of control processing relating to the adjustment of exposure and a focus according to a variation, and is a flowchart illustrating a variation of the control processing illustrated in FIG. 8 relating to the adjustment of exposure and a focus.

The flowchart illustrated in FIG. 12 is different from the flowchart illustrated in FIG. 8 only in processing in a case in which panning or walking is detected. Namely, in the flowchart illustrated in FIG. 12, the processes of S23 and S24 in the flowchart illustrated in FIG. 8 are replaced with the processes of S23A and S24A.

More specifically, as illustrated in FIG. 12, in this variation, when panning or walking is detected (when the determination result in S22 is Yes), the system controller 7 calculates a contrast evaluation value (S23A). The system controller 7 determines whether the contrast evaluation value is greater than a large-blurring determination threshold (S24A). The contrast evaluation value calculated in S23A is, for example, a contrast evaluation value in a focus area that is calculated by performing a photometry process or the like similarly to the processes of S25 and S26. The large-blurring determination threshold in S24A is a threshold to determine that a subject is obviously out of focus and that the contrast of a shot image is low. The large-blurring determination threshold may be a fixed value, or may be determined according to a contrast evaluation value before the detection of panning or walking.

When the determination result in S24A is Yes, the system controller 7 determines that a subject is not greatly out of focus, and maintains a current focus position and aperture value (an aperture position) of the optical system 2. When the determination result in S24A is No, it is determined that a subject is greatly out of focus, and the processing moves on to S25.

According to the variation above, when panning or walking is detected and when a subject is not greatly out of focus, the focus position and the aperture value (the aperture position) of the optical system 2 is maintained to a focus position and an aperture value immediately before the detection of panning or walking. When a subject is greatly out of focus, a focus is readjusted. Accordingly, a focus adjustment operation can be suppressed during panning or walking in comparison with a normal time (for example, a stationary time).

In this embodiment, as an example, in the timing chart illustrated in FIG. 11 illustrating a control switching relationship among imaging exposure control, aperture control, and ISO speed in a case in which a state is transitioned from a normal state to a walking detection state, aperture variable control may be omitted in the walking detection state, and a control switching relationship between imaging exposure control and ISO speed may be varied as described below.

Figure 13:
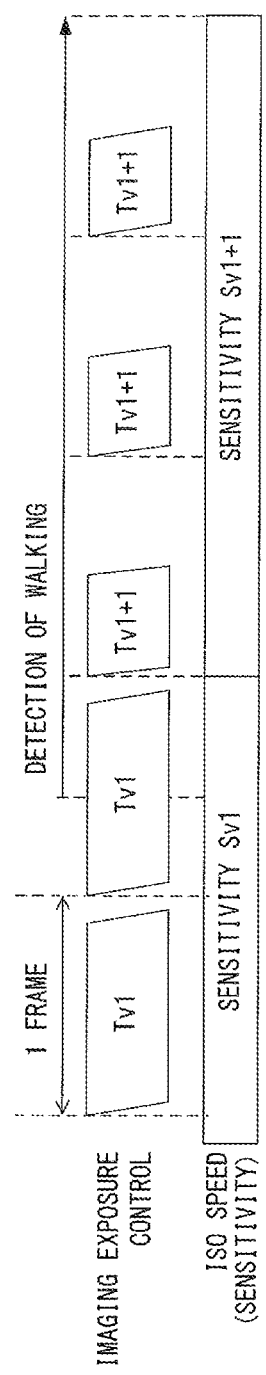
FIG. 13 is an example of a timing chart illustrating a control switching relationship between imaging exposure control and ISO speed in a case in which a state is transitioned from a normal state to a walking detection state according to a variation.

FIG. 13 is an example of a timing chart illustrating a control switching relationship between imaging exposure control and ISO speed in a case in which a state is transitioned from a normal state to a walking detection state according to the variation.

As illustrated in FIG. 13, in this variation, in each of the frames in the walking detection state (in a frame next to a frame at the time of detection of walking (start of walking) and the frames that follow), an exposure time is reduced, and shooting is performed by using an ISO speed that increases by an amount that corresponds to the reduction of the exposure time).

Consequently, in a shot image in each of the frames in the walking detection state, exposure blurring can be suppressed, and an exposure amount that is similar to that in normal shooting can be maintained by reducing an exposure time.

Second Embodiment

An imaging apparatus according to a second embodiment of the present invention is different from the imaging apparatus according to the first embodiment in a portion of a configuration and an operation. Differences in the second embodiment from the first embodiment will be principally described, and the same components as those in the imaging apparatus according to the first embodiment are described by using the same reference numerals.

FIG. 14 illustrates an exemplary configuration of a camera that is the imaging apparatus according to the second embodiment.

A camera 1 illustrated in FIG. 14 is different from the camera 1 illustrated in FIG. 1 in that the camera 1 illustrated in FIG. 14 further includes an acceleration sensor 13. The acceleration sensor 13 is a sensor that detects an acceleration in an optical axis direction of the optical system 2.

Figure 15:
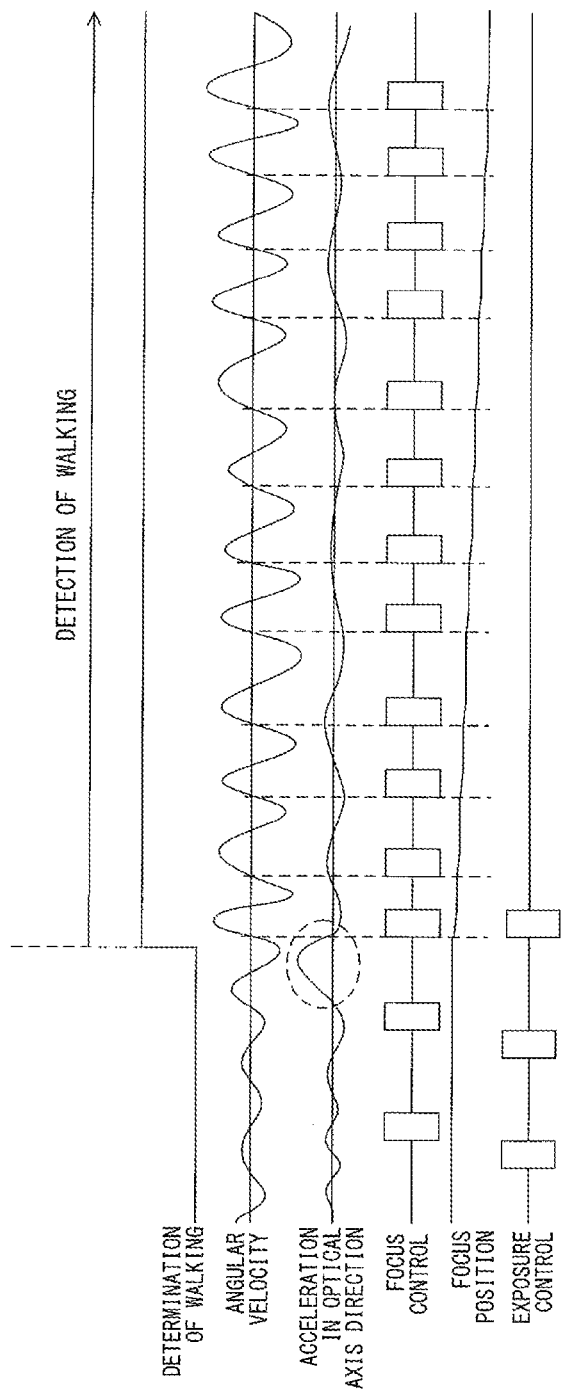
FIG. 15 is a timing chart illustrating an example of controlling a camera that is an imaging apparatus according to the second embodiment.

FIG. 15 is a timing chart illustrating an example of control of the camera 1 according to the second embodiment.

In this embodiment, a method for detecting walking is similar to that in the first embodiment.

However, in this embodiment, the blurring correction microcomputer 8 further detects a walking direction in the optical axis direction on the basis of a detection result of the acceleration sensor 13. When walking is performed, an acceleration in the walking direction is largely biased. The walking direction in the optical axis direction is detected by detecting a large bias in the acceleration (for example, a portion surrounded with a broken line in FIG. 15). The reason for detecting the walking direction in the optical axis direction is that a movement in the optical axis direction gives a large influence on a focus.

As illustrated in FIG. 15, when walking in the optical axis direction toward a subject is detected, a focus position is changed to a near side by one step, every time one step of walking is detected. One step of walking is detected when angular velocity zero-crosses in a state in which walking has been detected. In this example, one step is detected when angular velocity zero-crosses twice, but half a step may be detected when angular velocity zero-crosses once.

The reason for detecting walking at a timing at which angular velocity zero-crosses is that a focus can be adjusted when a change in angular velocity is the smallest, namely, at a timing at which there is no blurring, such that a focusing accuracy can be improved. However, the timing is not limited to the above.

Further, in focus control, a focus position is changed to a near side by one step at a zero-crossing timing in one walking cycle. With respect to the focus position illustrated in FIG. 15, an upper side of a page indicates an infinity side, and a lower side of the page indicates a near side.

In this example, a movement amount of one step is an average stride (for example, 50 cm). If a stride is recorded as individual data in the camera 1, a tracking accuracy of focus control can be further improved. Alternatively, a subject distance may be calculated when a focus is adjusted, and a stride may be calculated from a change in the subject distance. Walking speed may be calculated from a result of integrating acceleration, and a stride may be calculated according to the walking speed.

Figure 16:
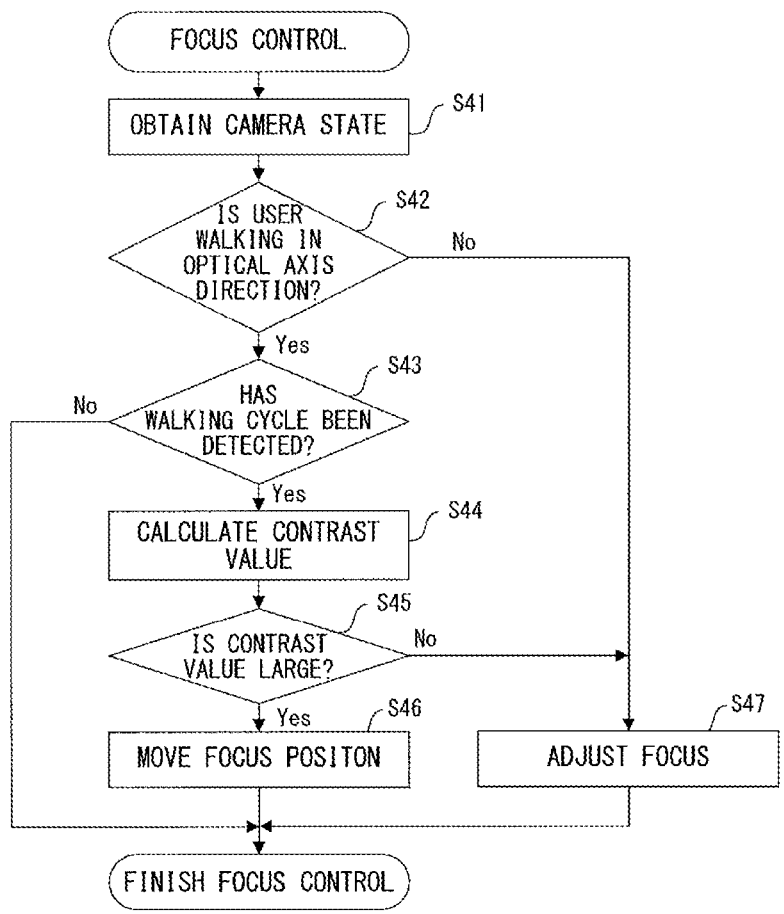
FIG. 16 is a flowchart illustrating an example of focus control processing performed by a system controller according to the second embodiment.

FIG. 16 is a flowchart illustrating an example of focus control processing performed by the system controller 7 according to the second embodiment.

As illustrated in FIG. 16, when this processing is started, the system controller 7 first obtains a camera state (S41).

Then, the system controller 7 determines whether a user is walking toward a subject in an optical axis direction, on the basis of the camera state obtained in S41 (S42).

When the determination result in S42 is Yes, the system controller 7 determines whether a walking cycle has been detected, on the basis of the camera state obtained in S41 (S43). The walking cycle is one cycle of the frequency of an angular velocity waveform when walking, and is a timing of zero-crossing.

When the determination result in S43 is Yes, the system controller 7 calculates a contrast value in a focus area (S44), and determines whether the contrast value is greater than a prescribed value (S45).

An area in which a specific subject such as a face is detected is used, for example, as an area in which the contrast value is calculated in S44. When this area is a subject area that has been detected before the determination of walking (before the detection of walking), the area is not switched during the determination of walking (during the detection of walking). However, the subject area will move due to blurring.

Accordingly, the area in which the contrast value is calculated is moved according to a detection result of the angular velocity sensor 9 or the acceleration sensor 13.

When the determination result in S45 is Yes, the system controller 7 moves a focus position to a near side by one step (S46).

When the determination result in S42 is No, or when the determination result in S45 is No, the system controller 7 adjusts a focus (S47).

When the determination result in S43 is No, or when the process of S46 or S47 is finished, one sequence of focus control processing is finished, and the processing returns to S41.

As described above, according to the second embodiment, a focus is adjusted according to a change in a focus position generated due to walking, and therefore the appearance of a video can be prevented from deteriorating due to the deviation of a focus in a scene in which blurring is generated greatly, for example, when walking.

The following variation can be made to this embodiment.

As an example, only when it is determined that a detected main subject is not moving may the focus control according to this embodiment (see FIG. 16) be performed.

As another example, when walking in a direction that is not the optical axis direction is detected, the focus control according to the first embodiment (see FIG. 8) may be performed.

In this embodiment, a blurring correction mechanism is included, but the blurring correction mechanism may be omitted if means for detecting panning or walking and means for detecting a walking direction are included.

In the respective embodiments above, the system controller 7 or the blurring correction microcomputer 8 is configured, for example, of a processor (a CPU) that performs arithmetic processing for performing the above various types of control or of an electronic circuit.

As described above, according to the respective embodiments above, an effect can be achieved that image quality can be suppressed from deteriorating in shooting a video when walking.

The present invention is not limited to the embodiments above with no change, and in an implementing stage, components can be varied and embodied without departing from the gist of the embodiments above. Various inventions can be made by appropriately combining a plurality of components disclosed in the embodiments above. As an example, some components of all of the components disclosed in the embodiment may be deleted. Further, components disclosed in different embodiments may be appropriately combined.

What is claimed is:

1. An imaging apparatus comprising:
    an optical system that includes a focus lens and an aperture;
    an image sensor that converts a subject image formed by the optical system into an electric signal;
    a reading control circuit that reads the electric signal converted by the image sensor;
    a shaking detection sensor that detects movement applied to the imaging apparatus, the shaking detection sensor including an angular velocity sensor and an acceleration sensor;
    a first processor configured to detect camera work in the imaging apparatus according to a detection result of the shaking detection sensor; and
    a second processor configured to control the focus lens and the aperture in the optical system so as to control focus adjustment and exposure adjustment, wherein
    the second processer switches control of the focus adjustment and exposure adjustment when the camera work is detected by the first processer, so as to suppress a movement of the focus lens position and change of exposure value while the camera work is being detected by the first processer,
    the second processor further sets imaging sensitivity for the image sensor, and
    while the camera work is being detected by the first processor, a sensitivity of the image sensor is increased, and an exposure time is decreased.

2. The imaging apparatus according to claim 1, wherein the camera work is panning or walking.

3. The imaging apparatus according to claim 2, wherein while walking toward a subject in an optical axis direction is being detected by the first processor, the second processor changes a focus lens position to a near side according to a walking cycle.

4. The imaging apparatus according to claim 2, wherein the first processor detects the walking, and detects a timing at which the movement applied to the imaging apparatus is small in a walking cycle in accordance with a detection result of the shaking detection sensor, and
    an evaluation value for the focus adjustment is obtained at the timing.

5. The imaging apparatus according to claim 1, wherein while the camera work is being detected by the first processor, the second processor fixes a focus lens position and an aperture position to a focus lens position and an aperture position immediately before detection of the camera work.

6. An imaging apparatus comprising:

an optical system that includes a focus lens and an aperture;

an image sensor that converts a subject image formed by the optical system into an electric signal;

a reading control circuit that reads the electric signal converted by the image sensor;

a shaking detection sensor that detects movement applied to the imaging apparatus, the shaking detection sensor including an angular velocity sensor and an acceleration sensor;

a first processor configured to detect camera work in the imaging apparatus according to a detection result of the shaking detection sensor; and a second processor configured to control the focus lens and the aperture in the optical system, wherein the second processer switches focus adjustment control and exposure adjustment control when the camera work is detected by the first processer, and while the camera work is being detected by the first processer, the second processer fixes a focus lens position to a focus lens position immediately before detection of the camera work, and changes an aperture value to an aperture value that makes a subject distance that corresponds to the focus lens position immediately before the detection of the camera work be a hyperfocal distance.

7. The imaging apparatus according to claim 6, wherein the camera work is panning or walking.

8. The imaging apparatus according to claim 6, wherein when the second processer changes the aperture value to an aperture value that makes the subject distance be the hyperfocal distance, the second processer changes a sensitivity of the image sensor according to an amount of a change in the aperture value due to the change in such a way that an exposure does not change between before and after the changing.

* * * * *